(12) United States Patent
Ko

(10) Patent No.: US 7,921,379 B1
(45) Date of Patent: Apr. 5, 2011

(54) SYSTEM AND METHOD FOR DISPLAYING RESULTS OF SEARCH

(76) Inventor: Sung-Min Ko, Koyang-si (KR)

(*) Notice: Subject to any disclaimer, the term of this patent is extended or adjusted under 35 U.S.C. 154(b) by 744 days.

(21) Appl. No.: 10/130,756

(22) PCT Filed: Aug. 24, 2000

(86) PCT No.: PCT/KR00/00954
§ 371 (c)(1),
(2), (4) Date: Sep. 27, 2002

(87) PCT Pub. No.: WO01/50346
PCT Pub. Date: Jul. 12, 2001

(30) Foreign Application Priority Data

Nov. 23, 1999 (KR) .............................. 1999-0052107

(51) Int. Cl.
*G06F 3/00* (2006.01)
(52) U.S. Cl. ........................................ 715/834; 715/733
(58) Field of Classification Search .................... 715/834
See application file for complete search history.

(56) References Cited

U.S. PATENT DOCUMENTS

| 5,907,837 | A  | * | 5/1999 | Ferrel et al. ........................... 1/1 |
| 5,933,827 | A  | * | 8/1999 | Cole et al. ........................ 707/10 |
| 5,940,076 | A  | * | 8/1999 | Sommers et al. ............. 715/834 |
| 5,953,718 | A  | * | 9/1999 | Wical ................................. 707/5 |
| 6,356,899 | B1 | * | 3/2002 | Chakrabarti et al. ............. 707/5 |
| 6,359,635 | B1 | * | 3/2002 | Perttunen ...................... 715/834 |
| 6,385,602 | B1 | * | 5/2002 | Tso et al. ........................... 707/3 |
| 6,448,987 | B1 | * | 9/2002 | Easty et al. .................... 715/834 |
| 6,519,585 | B1 | * | 2/2003 | Kohli .................................. 707/3 |
| 6,658,423 | B1 | * | 12/2003 | Pugh et al. ........................... 1/1 |
| 2002/0122072 | A1 | * | 9/2002 | Selker ............................ 345/834 |
| 2002/0169856 | A1 | * | 11/2002 | Plow et al. .................... 709/220 |

FOREIGN PATENT DOCUMENTS

| JP | 11-161669 | 6/1999 |
| KR | 2000-0012185 | 3/2000 |

OTHER PUBLICATIONS

International Search Report—PCT/KR01/01069, ISA/Korean Industrial Property Office, Dec. 11, 2000.

* cited by examiner

*Primary Examiner* — Ryan F Pitaro
(74) *Attorney, Agent, or Firm* — Dean A. Craine (57) ABSTRACT

The present invention relates to the system and the method for graphically displaying the results of search engine on a terminal of client, so that client can see a search process at first glance and move between a higher category and a lower easily and earn the results of search engine quickly.

10 Claims, 8 Drawing Sheets

SYSTEM AND METHOD FOR DISPLAYING RESULTS OF SEARCH

TECHNICAL FIELD

The present invention relates in general to systems and methods for displaying the results of searches, and more particularly to a searched result display system and method for graphically displaying the results of a search on a client's terminal so that the client can see a search process at a glance, freely move between higher-order and lower-order categories and obtain the searched results rapidly and easily.

BACKGROUND ART

Generally, a user searches for a desired keyword through an Internet search engine. For example, "Yahoo", "AltaVista" and "Lycos" may be Internet search engines recently used most often. These search engines employ uniform category systems, an example of which will hereinafter be described.

First, if a client enters a Korean keyword "말" (an English translation thereof may be "horse" or "language") through a specific search engine, then the results of a search for the entered keyword are displayed on a browser of the client according to categories as follows:

. . .
health/medicine>disease/symptom>malaria
news/media>television>programs>drama
society/culture>religion/image>
religion>Christianity>sect
entertainment>music>write, composition>text, music
region>country>Guatemala
. . .

Accordingly, the user must select a specific one of the displayed categories on the basis of a meaning of the Korean keyword "말" and then search the selected category for a desired text. On the other hand, provided that the selected category is too large to be displayed on one screen picture, the user will conduct a search process using a scroll on the browser, and, upon recognizing that the selected category is not a desired one, the user will return to a previous picture. In other words, existing display methods for search engines display the results of searches one-dimensionally, resulting in an inconvenience in changing between previous and next pictures.

Figure 1:
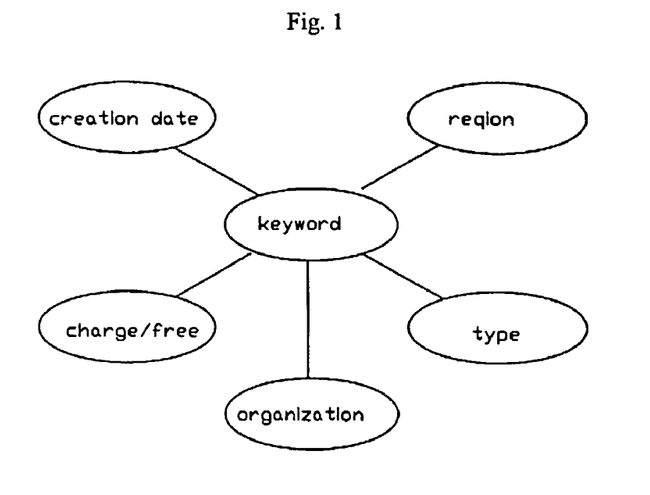
FIG. 1 is a view showing a browser picture for illustration of a conventional Internet search method.

A different display method is disclosed in Korean Patent Laid-open Publication No. 1999-0048712, entitled "MAP-TYPE CLASSIFICATION SEARCH METHOD FOR INTERNET INFORMATION SEARCH", and shown in FIG. 1 herein.

FIG. 1 is a view showing a browser picture for illustration of the map-type classification search method. If a client enters a keyword to be searched for, then the results of a search for the entered keyword are displayed while being classified by regions, types, holding organizations and other categories about the entered keyword. Hence, the user selects a specific one of the displayed categories. The selected category is recognized as one keyword and the searched results are thus displayed according to other categories related to the selected category, similarly to the above browser picture.

The above-mentioned map-type classification search method is desirable to display the results of search by categories about a specific keyword, but has a disadvantage in that a clicked one of the categories has no link to a subsequent browser picture, leading to a degradation in search efficiency. This search method further displays no rate or number of accesses to each category. For this reason, the user may undesirably gain access to a site with a low frequency, resulting in an increase in search time.

DISCLOSURE OF THE INVENTION

Therefore, the present invention has been made in view of the above problems, and it is an object of the present invention to provide a searched result display system and method which can graphically display the results of a search on a client's terminal so that the client can see a search process at a glance, freely move between higher-order and lower-order categories and obtain the searched results rapidly and easily.

In accordance with one aspect of the present invention, the above and other objects can be accomplished by the provision of a system for displaying the results of a search, comprising at least one terminal, a plurality of Web sites, a server for searching the Web sites or Web pages thereof for at least one keyword entered through the terminal and displaying the searched results on the terminal, and an open network for interconnecting the terminal, Web sites and server, wherein the server includes a search module for searching the Web sites or Web pages for the keyword; a searched result database for storing the results searched by the search module; a searched result storage module for storing the results searched by the search module in the searched result database; and a display module for graphically displaying the searched results stored in the searched result database on a screen of the terminal.

Preferably, the server may further include a filtering module for filtering duplicately searched results stored in the searched result database and storing the filtered results again in the database.

Preferably, the display module may arrange an nth polygon or circle on the screen of the terminal, display an nth-order category within the nth polygon or circle, arrange an n+1th polygon or circle outside of the nth polygon or circle and display an n+1th-order category between the nth polygon or circle and the n+1th polygon or circle.

Further, the display module may arrange a different polygon or circle inside of the nth polygon or circle and display the keyword within the different polygon or circle.

Further, the display module may display the nth-order or n+1th-order category together with the rate or number of accesses thereto.

Further, the display module may act to, if any one item is selected in the n+1th-order category under the condition that the n+1th-order category is a lowest-order one, display a list of Web sites associated with the selected item in a specific portion of a sub-window.

Further, the display module may act to, if any one Web site is selected from the Web site list, display information regarding the selected Web site in a different portion of the sub-window or another sub-window.

As an alternative, the display module may arrange a polygon or circle on the screen of the terminal, display an nth-order category on an edge of the polygon or a circumference of the circle and then hierarchically display selected items in higher-order categories within the polygon or circle.

Further, the display module may arrange a different polygon or circle inside of the polygon or circle and display the keyword within the different polygon or circle, the different polygon or circle having a diameter smaller than ½ that of the polygon or circle.

Further, the display module may display the nth-order category together with the rate or number of accesses thereto.

Further, the display module may act to, if any one item is selected in the nth-order category under the condition that the nth-order category is a lowest-order one, display a list of Web sites associated with the selected item in a specific portion of a sub-window.

Further, the display module may act to, if any one Web site is selected from the Web site list, display information regarding the selected Web site in a different portion of the sub-window or another sub-window.

In accordance with another aspect of the present invention, there is provided a method for displaying the results of a search on at least one terminal using the terminal, a plurality of Web sites, a server for searching the Web sites or Web pages thereof for at least one keyword entered through the terminal and displaying the searched results on the terminal, and an open network for interconnecting the terminal, Web sites and server, the method comprising the steps of a) searching the Web sites or Web pages for the keyword; b) storing the results searched at the step a) in the server; and c) graphically displaying the searched results stored at the step b) on a screen of the terminal.

Preferably, the method may further comprise, subsequent to the step b), the step of filtering duplicately searched results stored in the server and storing the filtered results again in the server.

Preferably, the step c) may include the step of arranging an nth polygon or circle on the screen of the terminal, displaying an nth-order category within the nth polygon or circle, arranging an n+1th polygon or circle outside of the nth polygon or circle and displaying an n+1th-order category between the nth polygon or circle and the n+1th polygon or circle.

The step c) may further include the step of arranging a different polygon or circle inside of the nth polygon or circle and displaying the keyword within the different polygon or circle.

The step c) may further include the step of displaying the nth-order or n+1th-order category together with the rate or number of accesses thereto.

The step c) may further include the step of, if any one item is selected in the n+1th-order category under the condition that the n+1th-order category is a lowest-order one, displaying a list of Web sites associated with the selected item in a specific portion of a sub-window.

The step c) may further include the step of, if any one Web site is selected from the Web site list, displaying information regarding the selected Web site in a different portion of the sub-window or another sub-window.

As an alternative, the step c) may include the step of arranging a polygon or circle on the screen of the terminal, displaying an nth-order category on an edge of the polygon or a circumference of the circle and then hierarchically displaying selected items in higher-order categories within the polygon or circle.

The step c) may further include the step of arranging a different polygon or circle inside of the polygon or circle and displaying the keyword within the different polygon or circle, the different polygon or circle having a diameter smaller than ½ that of the polygon or circle.

The step c) may further include the step of displaying the nth-order category together with the rate or number of accesses thereto.

The step c) may further include the step of, if any one item is selected in the nth-order category under the condition that the nth-order category is a lowest-order one, displaying a list of Web sites associated with the selected item in a specific portion of a sub-window.

The step c) may further include the step of, if any one Web site is selected from the Web site list, displaying information regarding the selected Web site in a different portion of the sub-window or another sub-window.

Herein, the term "terminal" is defined as any computer, any mobile terminal such as a cellular phone, personal communication service (PCS) phone, personal digital assistant (PDA), international mobile telecommunications (IMT)-2000 terminal or the like, or any Internet television (TV), which is connectable to an Internet network or quasi-Internet network. A representative Internet network may be, for example, an "open network", over which the terminal is connectable to a server at any location. This Internet network may be a wired or wireless Internet network, wired telephone network, wireless telephone communication network or a combination thereof.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 2:
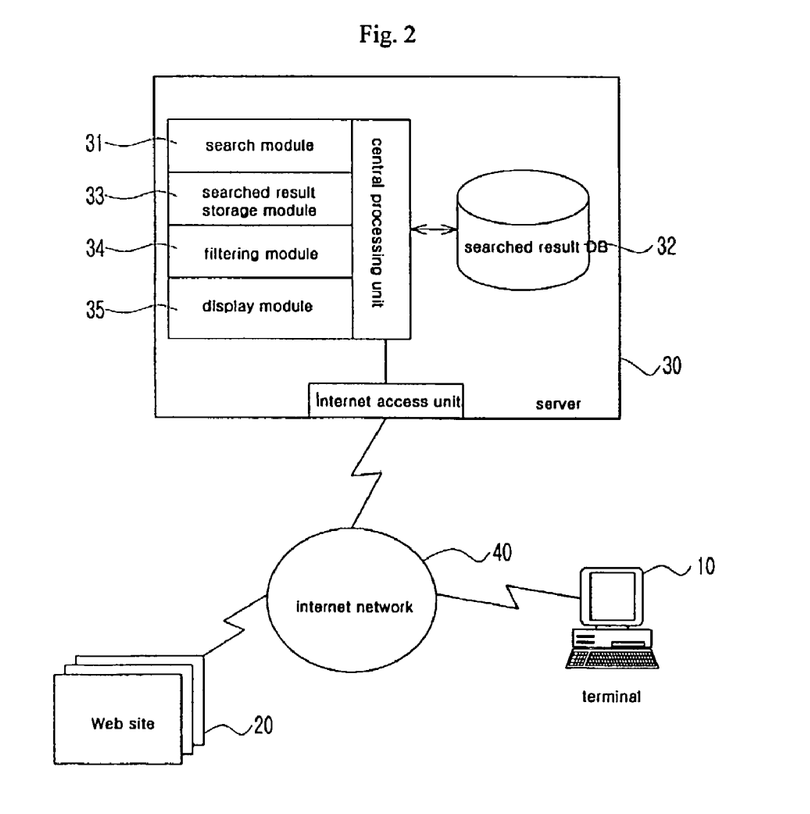
FIG. 2 is a view schematically showing the construction of a searched result display system in accordance with the present invention.

With reference to FIG. 2, there is schematically shown the construction of a searched result display system in accordance with the present invention.

As shown in FIG. 2, the searched result display system comprises at least one terminal 10, a plurality of Web sites 20, a server 30 and an Internet network 40.

The Web sites 20 are one or more sites that the terminal 10 desires to search.

The server 30 includes a search module 31, searched result database (DB) 32, searched result storage module 33, filtering module 34 and display module 35.

The search module 31 searches the Web sites 20 in response to a request from the terminal 10. Although the search module 31 can directly search the Web sites 20 for a keyword entered in the terminal 10, it may search the Web sites 20 through a typical search engine, such as Yahoo, Simmani, Empas, Lycos or the like.

The searched result DB 32 is adapted to store the results of a search. This DB 32 preferably has a site name field, uniform resource locator (URL) field and site description field.

The searched result storage module 33 is adapted to store the results searched by the search module 31 in the searched result DB 32.

The filtering module 34 acts to filter the same Web site results of a search for a specific keyword, stored in the searched result DB 32, and store the filtered results again in the DB 32. For example, if the results of a search are the same URL, the filtering module 34 deletes them leaving only any one thereof. Where the results of a search are the same site name, the filtering module 34 deletes them leaving only any one thereof, too. In case five searched results are the same URL or site name, the filtering module 34 leaves only any one of the searched results and combines five site descriptions into one, which is in turn stored in the searched result DB 32.

It should be noted herein that the filtering module 34 is not an essential constituent element of this invention.

The display module 35 functions to graphically display the results of a search stored in the searched result DB 32 on the terminal 10.

States displayed by the display module 35 are shown in FIGS. 4a to 4d, FIGS. 5a to 5d and FIGS. 6a to 6d.

Figure 3:
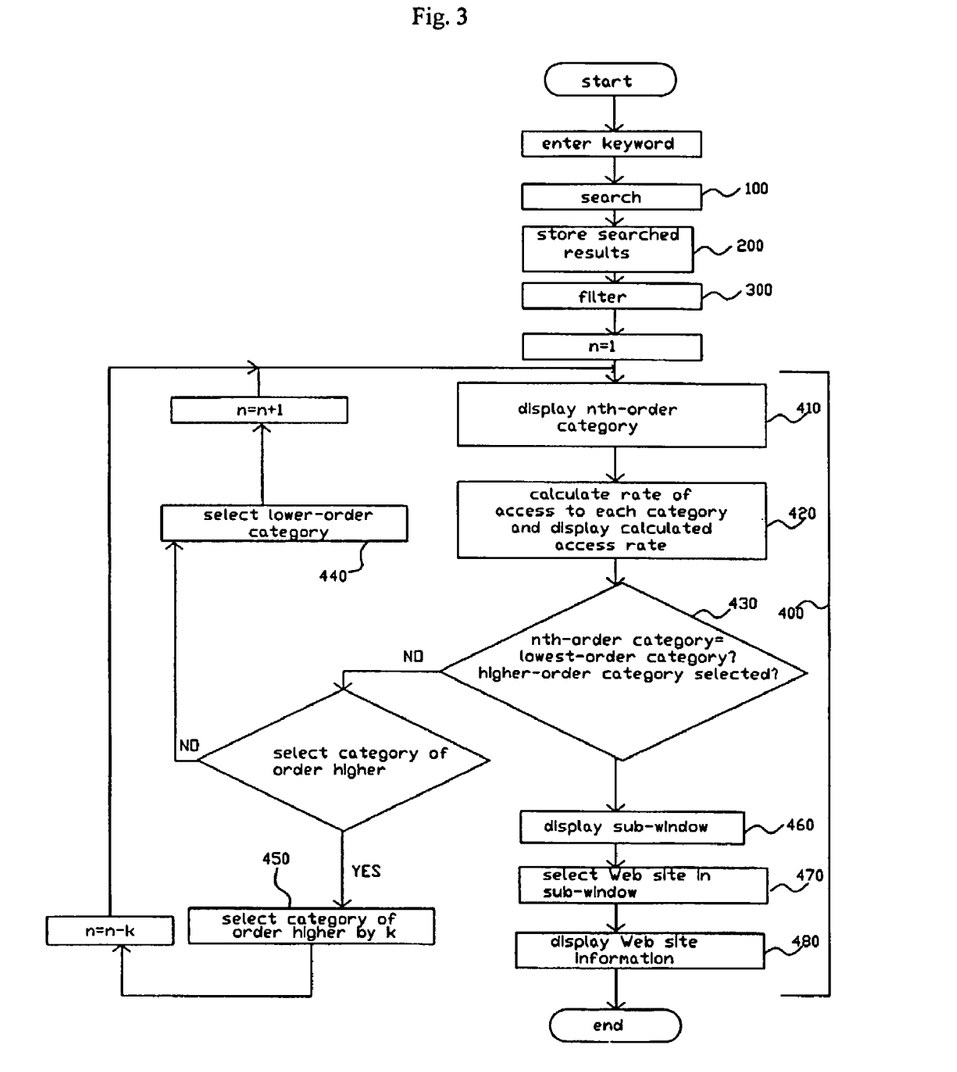
FIG. 3 is a flowchart illustrating a searched result display method in accordance with the present invention.

FIG. 3 is a flowchart illustrating a searched result display method in accordance with the present invention.

As shown in FIG. 3, the searched result display method comprises a search step 100, searched result storage step 200, filtering step 300 and display step 400.

First, if a client gains access to a Web site constructed according to the present invention and enters a keyword in the Web site (not shown in FIG. 3), then the server (30 in FIG. 2) searches the Web sites (20 in FIG. 2) connected to the Internet network (40 in FIG. 2) for the entered keyword at the search step 100. At this search step 100, the server 30 may search the Web sites 20 for the entered keyword through a typical search engine, such as Yahoo, Simmani, Empas, Lycos or the like, although it can directly search the Web sites 20.

At the searched result storage step 200, the server 30 stores the results searched at the search step 100 in the searched result DB (32 in FIG. 2).

At the filtering step 300, the server 30 filters the searched results stored at the searched result storage step 200. That is, the server 30 filters the same Web site results of a search for a specific keyword, stored in the searched result DB 32, and stores the filtered results again in the DB 32. For example, if the results of a search are the same URL, the server 30 deletes them leaving only any one thereof. Where the results of a search are the same site name, the server 30 deletes them leaving only any one thereof, too. Provided that five searched results are the same URL or site name, the server 30 leaves only any one of the searched results and combines five site descriptions into one. The server 30 then stores the left and combined results in the searched result DB 32.

It should be noted herein that the filtering step 300 is not an essential constituent element of this invention.

At the display step 400, the server 30 graphically displays the searched results stored in the searched result DB 32 at the searched result storage step 200 or the filtering step 300 on the terminal (10 in FIG. 2) to provide a visual indication thereof to the client, as will hereinafter be described in detail.

First, the server 30 displays the highest-order category, or a first-order one, among the results of a search (410). The server 30 then calculates the rate of access to each category and displays the calculated access rate (420). The client will select any one item in the displayed category. It should be noted herein that the step 420 may be omitted because it is not an essential constituent element of this invention.

If the server 30 has displayed a fifth-order category by the client's four selections, then it determines whether the fifth-order category is the lowest-order one (430). Where the fifth-order category is determined not to be the lowest-order one, the server 30 allows the client to select a higher-order or lower-order category (450 or 440), and then returns to the above step 410. Alternatively, upon determining at the above step 430 that the fifth-order category is the lowest-order one, the server 30 displays a sub-window if the client selects any one item in the fifth-order category (460), and then outputs a Web site (or a list of Web sites) associated with the selected item to the sub-window. If the client selects the Web site (or any one of the Web sites) in the sub-window (470), then the server outputs information regarding the selected Web site to the sub-window or another sub-window (480).

A more detailed description will hereinafter be given of the display step 400 performed by the display module 35 in the server 30 with reference to various embodiments of the present invention. It should be noted herein that these embodiments will be disclosed for illustrative purposes, and so the present invention is not limited thereto.

Embodiment 1

FIGS. 4a to 4d are views showing screen picture configurations in accordance with a preferred embodiment of the present invention.

Figure 4A:
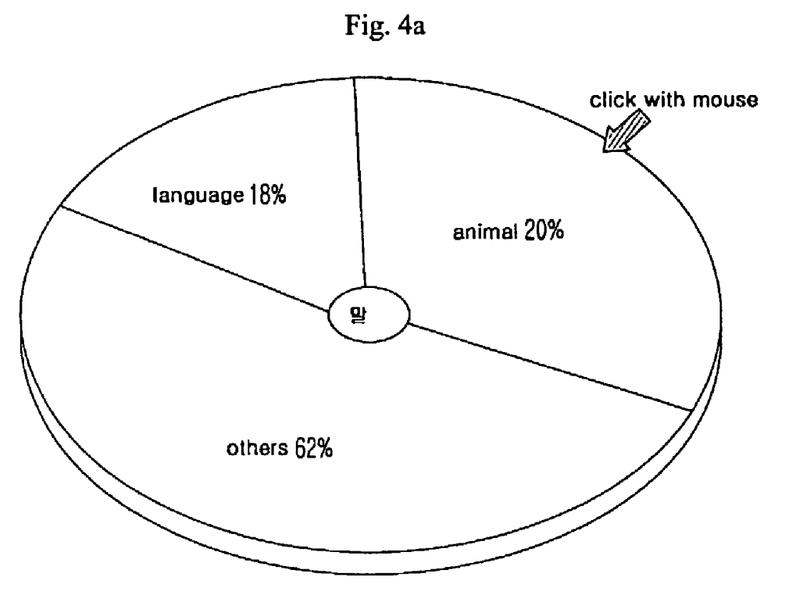
FIGS. 4a to 4d are views showing screen picture configurations in accordance with a preferred embodiment of the present invention.

In this embodiment, a given keyword is Korean "말" (an English translation thereof may be "horse" or "language"). Referring first to FIG. 4a, the keyword "말" is displayed on the central portion of a graph, and an animal item, language item and other items, which are items of a first-order category, are graphically displayed around the keyword. A percentage is displayed together with each of the items of the first-order category to indicate the rate of click on each item. Notably, the click rate may be omitted because it is not an essential element of the present invention. If the client clicks on the animal item with a mouse, then a picture of FIG. 4b is displayed.

Figure 4B:
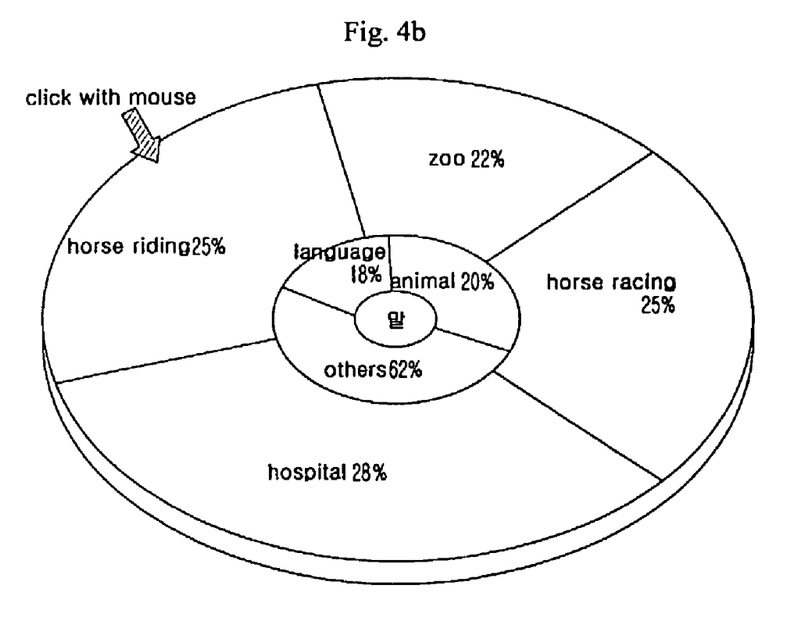

FIG. 4b shows a picture displayed when the client clicks on the animal item in FIG. 4a, wherein a second-order category is displayed surrounding the first-order category. The second-order category is provided with four items, or a zoo item, horse racing item, hospital item and horse riding item. As stated above, percentages are displayed to indicate the rates of click on the respective items. If the client clicks on the horse riding item among the above items, then the display proceeds to a picture of FIG. 4c.

Figure 4C:
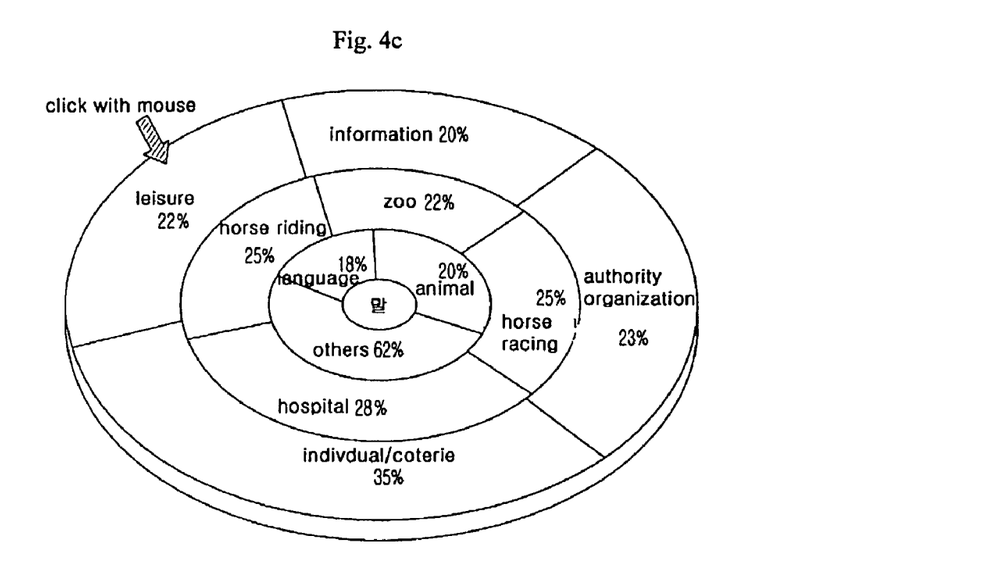

FIG. 4c shows a picture displayed when the client clicks on the horse riding item in FIG. 4b, wherein a third-order category is displayed surrounding the second-order category. The third-order category is provided with four items, or an information item, authority/organization item, individual/coterie item and leisure item. If the client clicks on the leisure item among the above items, then the display moves to a picture of FIG. 4d.

Figure 4D:
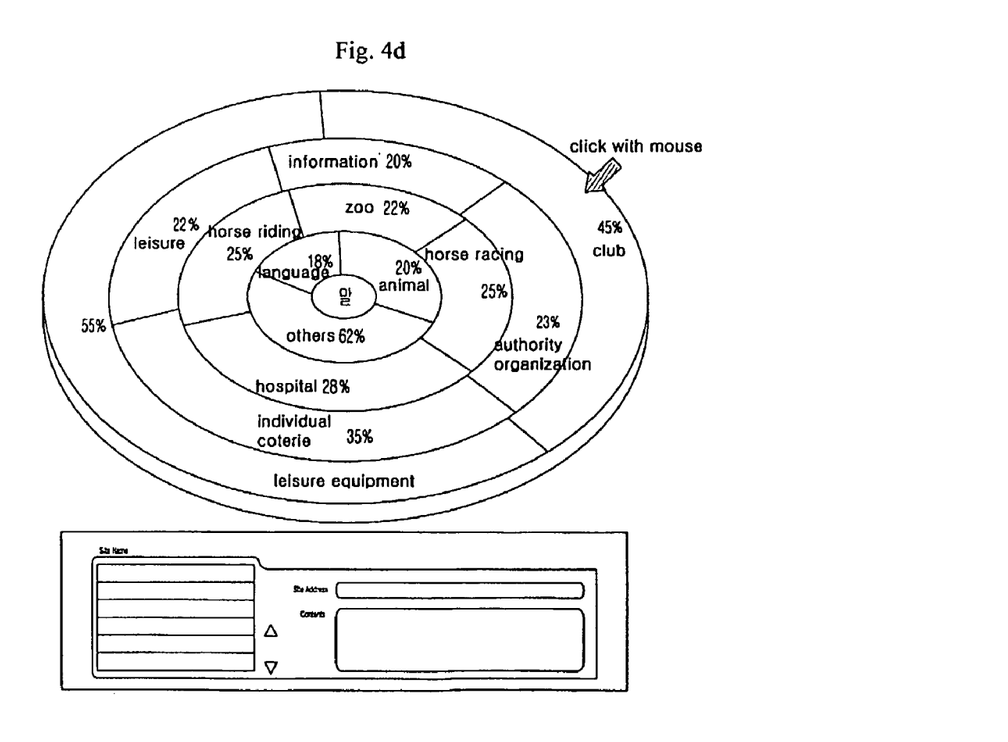
Figure 5A:
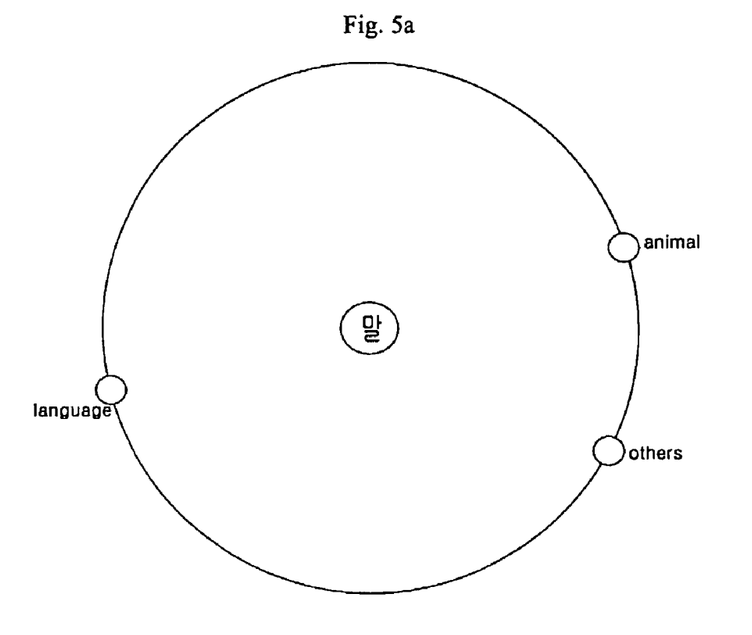
FIGS. 5a to 5d are views showing screen picture configurations in accordance with an alternative embodiment of the present invention.
Figure 5B:
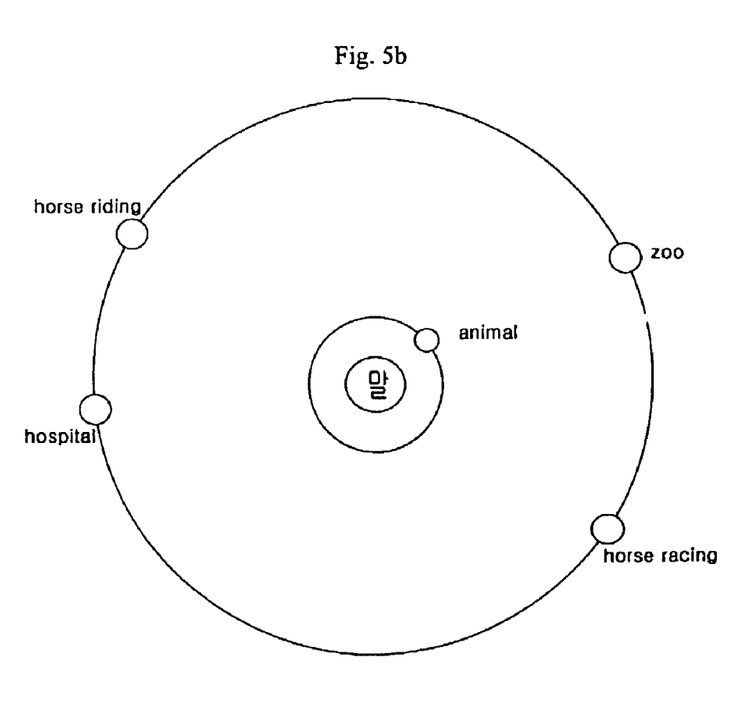
Figure 5C:
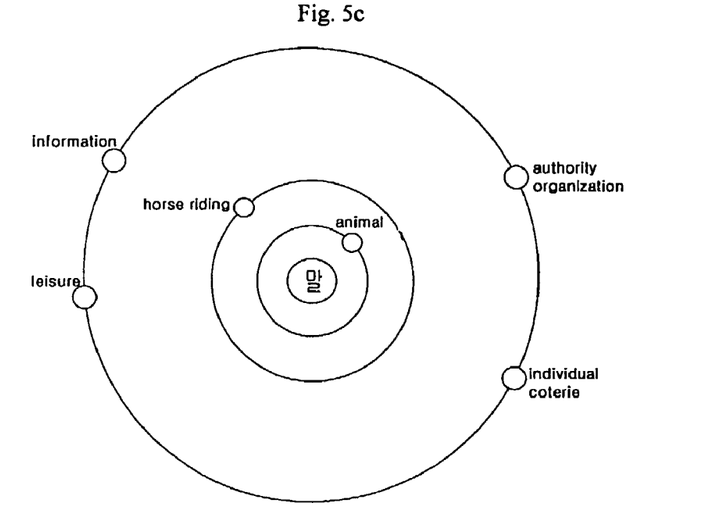
Figure 5D:
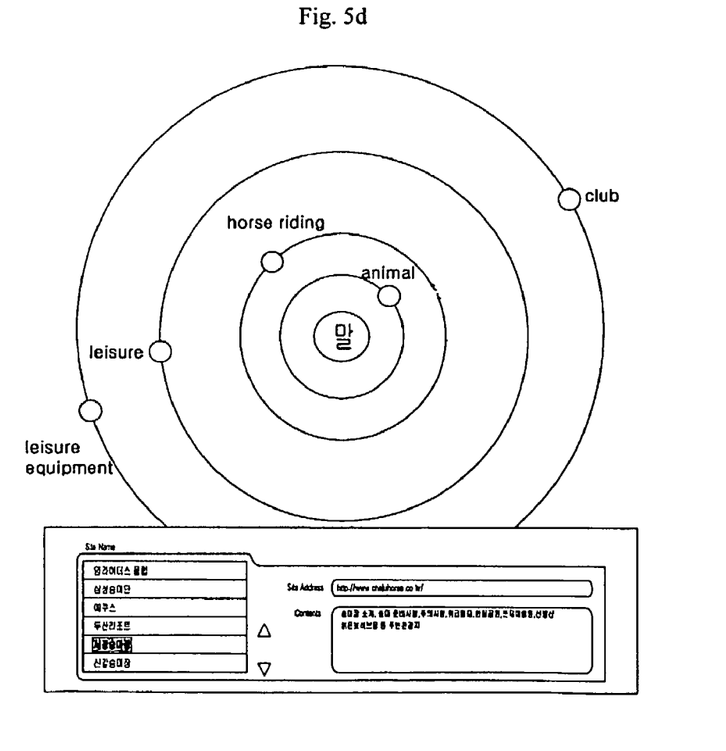

FIG. 4d shows a picture displayed when the client clicks on the leisure item in FIG. 4c, wherein a fourth-order category is displayed surrounding the third-order category. The fourth-order category is provided with two items, or a club item and leisure equipment item. If the client clicks on the club item, then a sub-window is displayed on the lower portion of the screen and names of clubs are in turn displayed on the left portion of the sub-window. If the client clicks on Lions Racecourse among the clubs, then an associated URL and description are displayed on the right portion of the sub-window.

Embodiment 2

FIGS. 5a to 5d are views showing screen picture configurations in accordance with an alternative embodiment of the present invention.

The second embodiment is substantially the same in configuration as the first embodiment, with the exception that it does not display the click rates displayed in the first embodiment, and draws small circles on the circumference of the main circle and displays respective items beside them, whereas the first embodiment divides the entire area of the main circle into a plurality of sub-areas and displays respective items on the divided sub-areas.

Embodiment 3

FIGS. 6a to 6d are views showing screen picture configurations in accordance with another embodiment of the present invention.

Figure 6A:
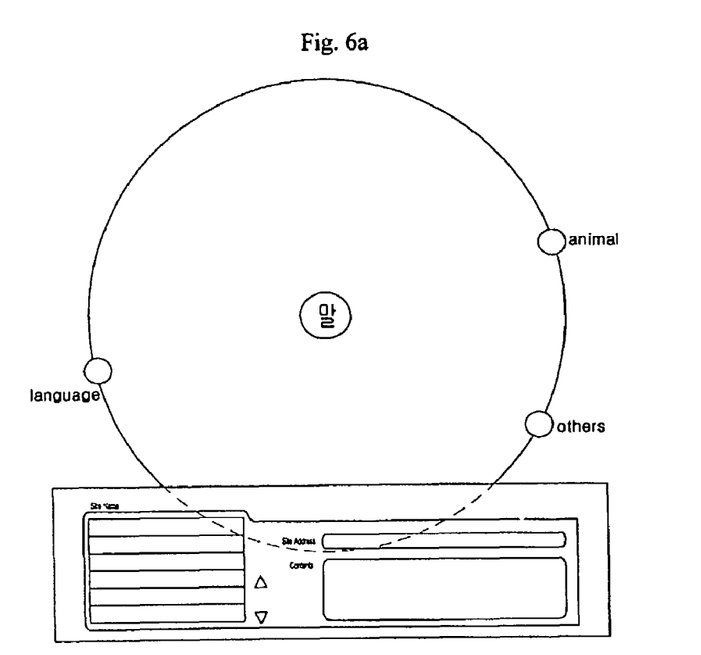
FIGS. 6a to 6d are views showing screen picture configurations in accordance with another embodiment of the present invention.

The third embodiment is somewhat different in configuration from the first embodiment or second embodiment. In the third embodiment, initially, small circles are drawn on the circumference of the main circle and respective items are displayed beside them, as shown in FIG. 6a, similarly to the second embodiment. In FIG. 6a, a sub-window is shown to be initially displayed, although it may be omitted.

Figure 6B:
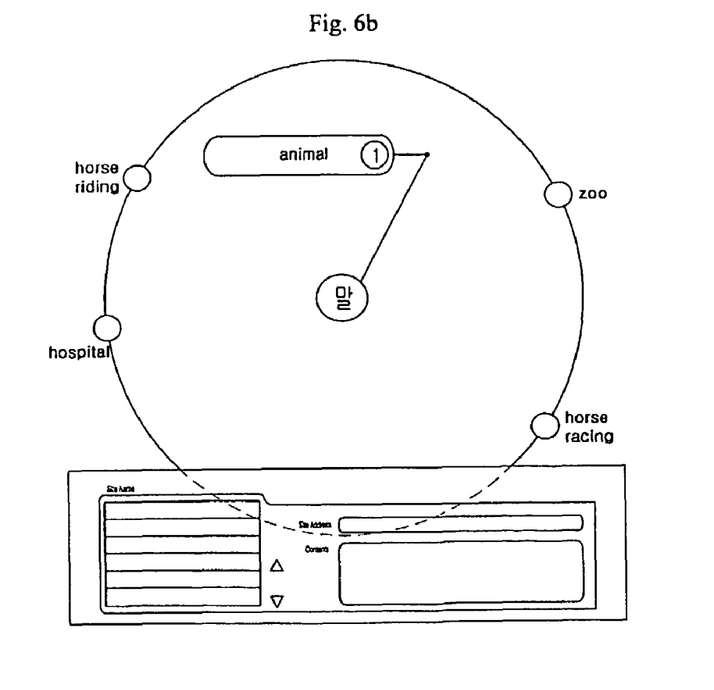
Figure 6C:
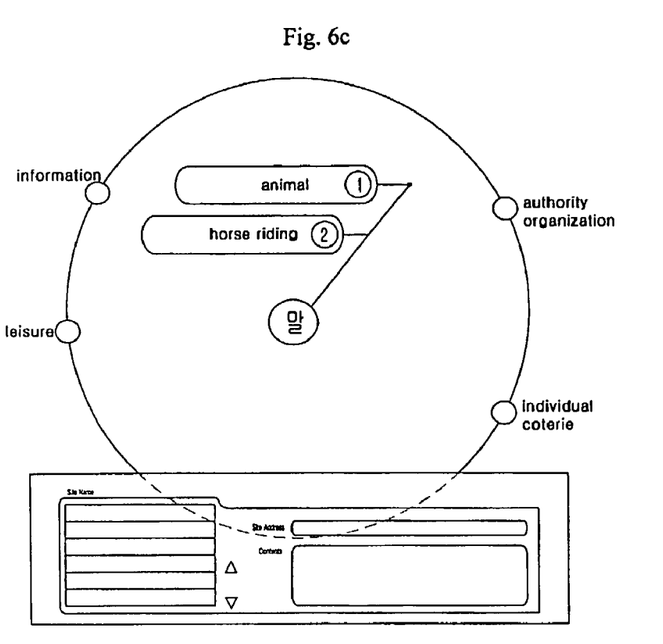
Figure 6D:
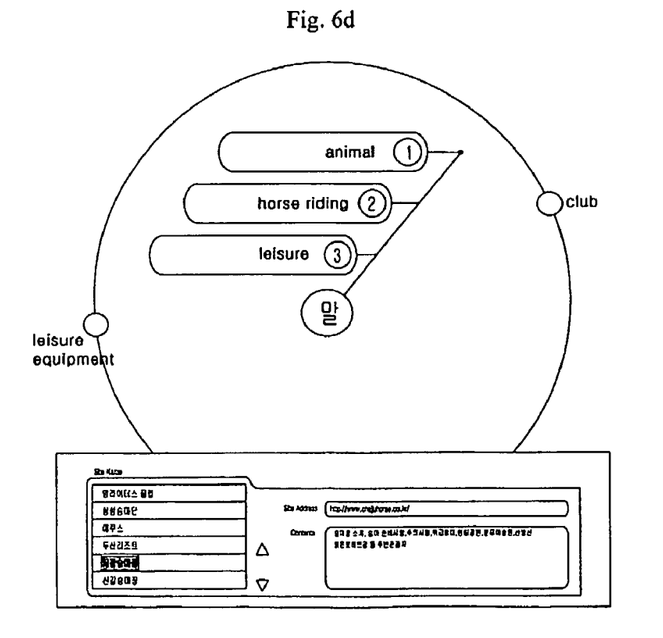

If the client clicks on an animal item in FIG. 6a, then the display proceeds to a picture of FIG. 6b. In FIG. 6b, the second-order category is shown to include four items, or a zoo item, horse racing item, hospital item and horse riding item. Also, only a selected item of the higher-order category, or the first-order category, is displayed at a certain position inside of the main circle. The same display process is also performed in FIG. 6c or 6d.

Although the preferred embodiments of this invention have employed circular graphs for illustrative purposes, those skilled in the art will appreciate that hexagonal, rectangular or octagonal graphs or multiple shape-mixed graphs are employable to display the results of a search, without departing from the scope and spirit of the invention.

INDUSTRIAL APPLICABILITY

As apparent from the above description, the present invention provides a searched result display system and method for graphically displaying the results of a search on a client's terminal. Therefore, the client can see a search process at a glance, freely move between higher-order and lower-order categories and obtain the searched results rapidly and easily.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A system for displaying the results of a search, comprising at least one terminal with a display, an open network that interconnects with said terminal, a plurality of Web sites and Web pages each associated with a unique uniform resource locator used on said open network, a server for searching said open network for Web sites or Web pages for at least one keyword entered through said terminal and displaying the search results on said display, said server includes:
   a search module for searching said Web sites or Web pages for said keyword;
   a searched result database for storing the search results containing Web sites or Web pages in which said keyword is found by said search module;
   a filtering module for filtering searched results stored in said searched result database so that Web sites and Web pages in said searched result database are not duplicated; and
   a display module for graphically presenting said search results after being filtered by said filtering module stored in said searched result database on said display of said terminal, said display module presents said search results that have the same hierarchical search order in a polygon or circle.

2. The system as set forth in claim 1, wherein said display module is adapted to present said keyword on said display.

3. The system as set forth in claim 1, wherein said display module presents the hierarchal order of records shown on said polygon or circle.

4. The system as set forth in any one of claim 1 to claim 3, wherein said display presents a list of Web sites associated with the records shown on said polygon or circle.

5. A method for displaying the results of a search on at least one terminal with a display using said terminal, a plurality of Web sites, a server for searching said Web sites or Web pages thereof for at least one keyword entered through said terminal and displaying the searched results on said terminal, and an open network for interconnecting said terminal, Web sited and server, said method comprising the steps of:
   a) searching said Web sites or Web pages for said keyword;
   b) storing the results searched at said step a) in said server;
   c) graphically displaying said searched results stored at said steps b) on a display of said terminal in hierarchal order on said display of said terminal, said display module arranges said search results in concentrically aligned polygons or circles, said inner most polygon or circle presents a plurality of search engine categories which when selected, automatically creates an outer concentrically aligned polygon or circle around the inner most polygon or circle with categories that have a higher hierarchal search order that the selected category on said lower polygon or circle.

6. The method as set forth in claim 5, wherein said step c) further includes the step of arranging a different polygon or circle inside of said nth polygon or circle and displaying said keyword within said different polygon or circle.

7. The method as set forth in claim 5, wherein said step c) further includes the step of displaying said nth-order or n+1th-order category together with the rate or number of accesses thereto.

8. The method as set forth in claim 5, wherein said step c) further includes the step of, if any one Web site is selected from said Web site list, displaying information regarding the selected Web site in a different portion of said sub-window or another sub-window.

9. The method as set forth in claim 5, wherein said step c) includes the step of arranging a polygon or circle on said screen of said terminal, displaying an nth-order category on an edge of said polygon or a circumference of said circle and then hierarchically displaying selected items in higher-order categories within said polygon or circle.

10. A method for presenting on a display the search results for the uniform resource locator of a webpage or website that contains a keyword from a search engine connected to the Internet network, the method comprising:
   a. imputing said keyword into said search engine connected to web said Internet network, a network of web sites and web pages, each said web site and web page containing a keyword and associated with a uniform resource locator;

b. conducting a keyword search using said search engine for web sites and web pages on said Internet network in which said keyword is located, each said web site or web page in which said keyword is located has a searching hierarchical order;
c. filtering said search results so that uniform resource located associated with said web sites and web pages are not duplicated; and,
d. presenting said filtered search results using one or more polygons or circles on said display, each said polygon or circle being assigned to a hierarchical search order with the categories in said search order associated with said polygon or circle being presented on or around said polygon or circle, when said filtered search results contains categories from different hierarchical orders, a polygon or circle is assigned to each hierarchical order and said categories having the same hierarchical order are presented around on said polygon or circle, the categories in the polygon or circle having the lower hierarchical order being presented with its uniform resource locator.

* * * * *